C. RANKIN.
GLASS MOLDING MACHINE.
APPLICATION FILED FEB. 11, 1916.

1,217,635.

Patented Feb. 27, 1917.
12 SHEETS—SHEET 2.

Inventor
Care Rankin
By
Geo. E. Tew
Attorney

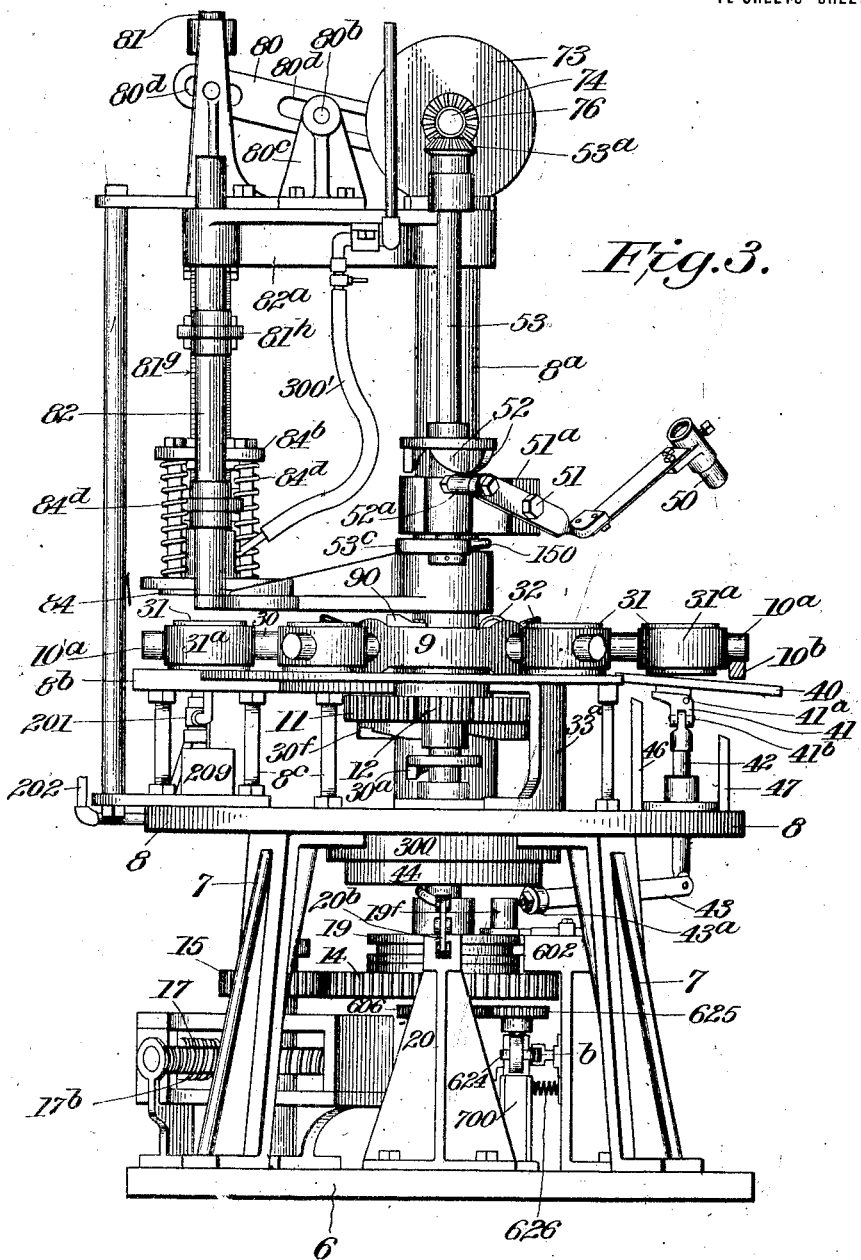

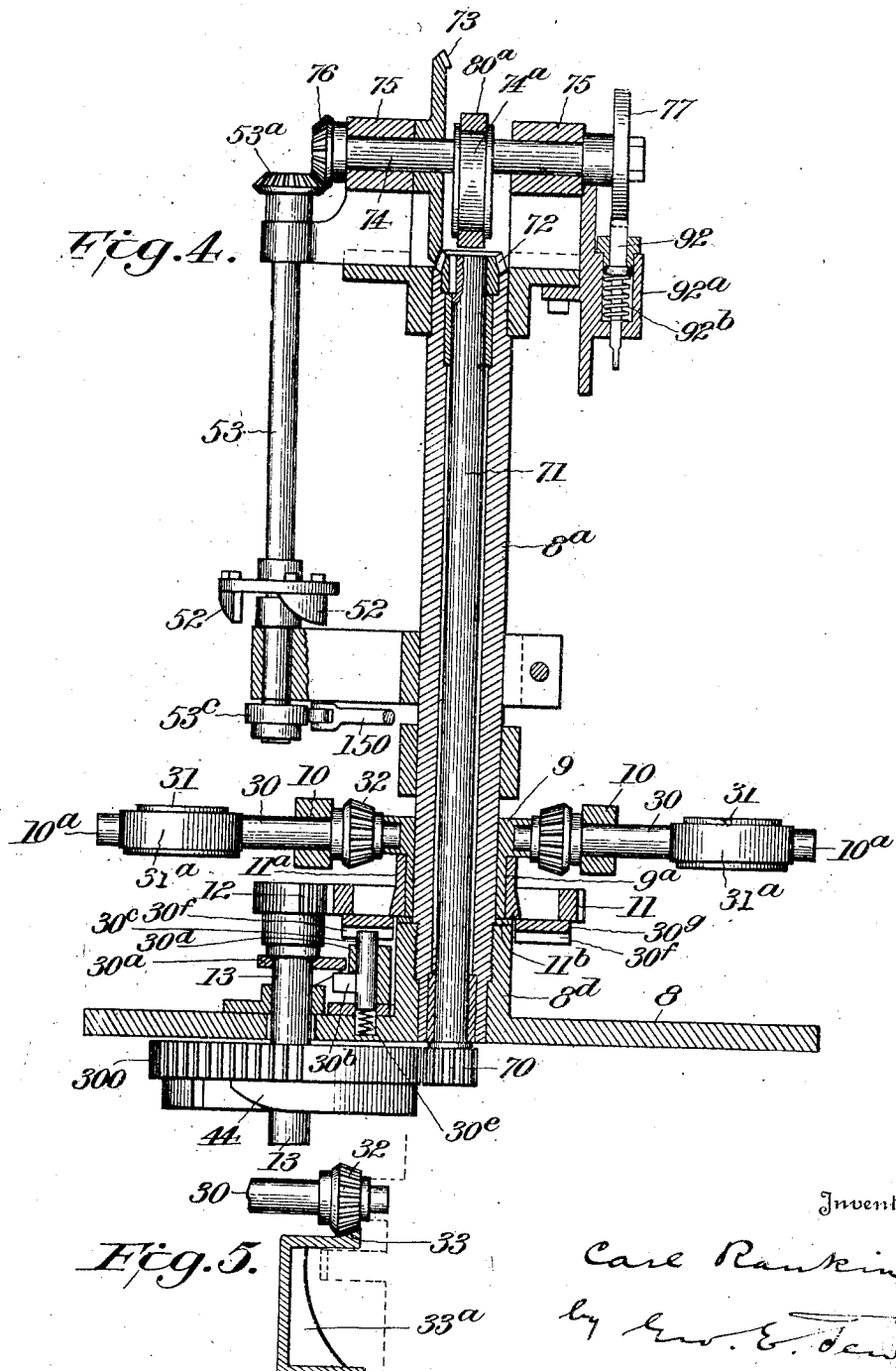

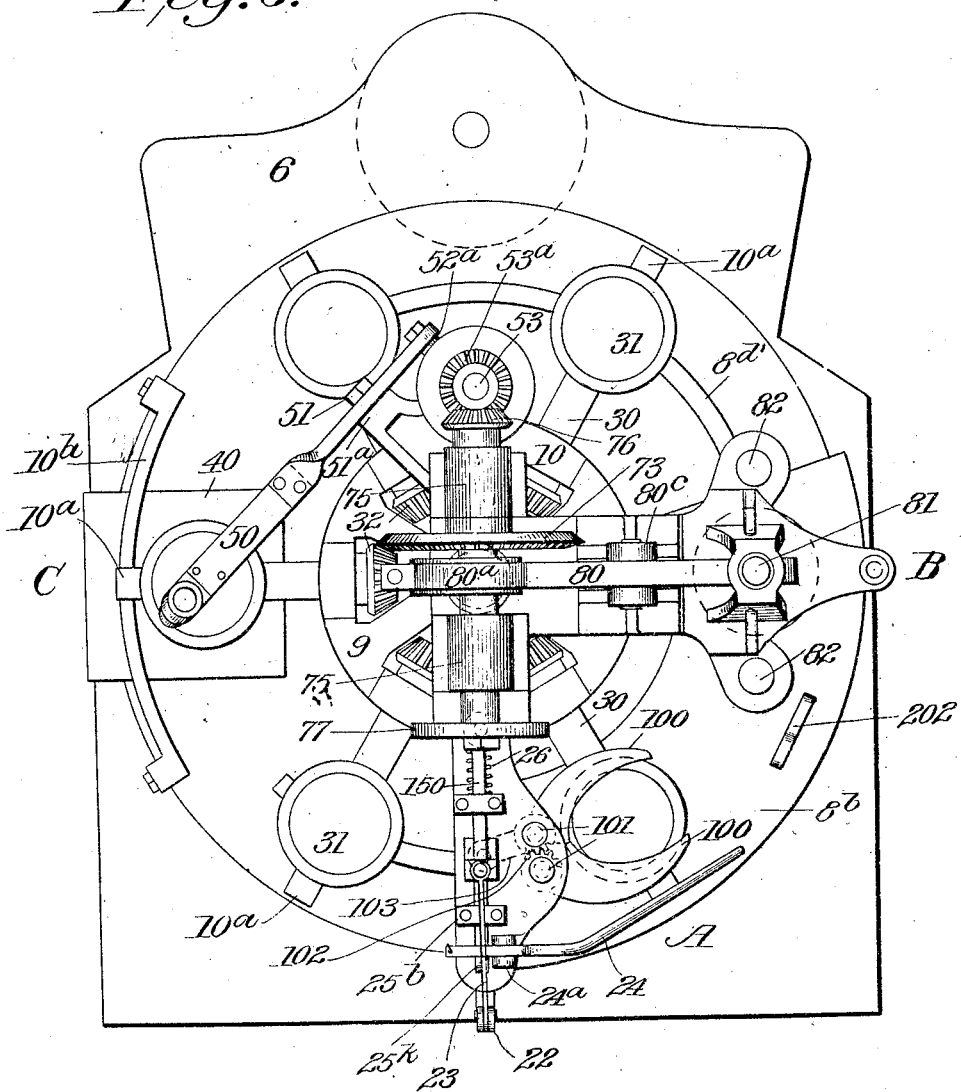

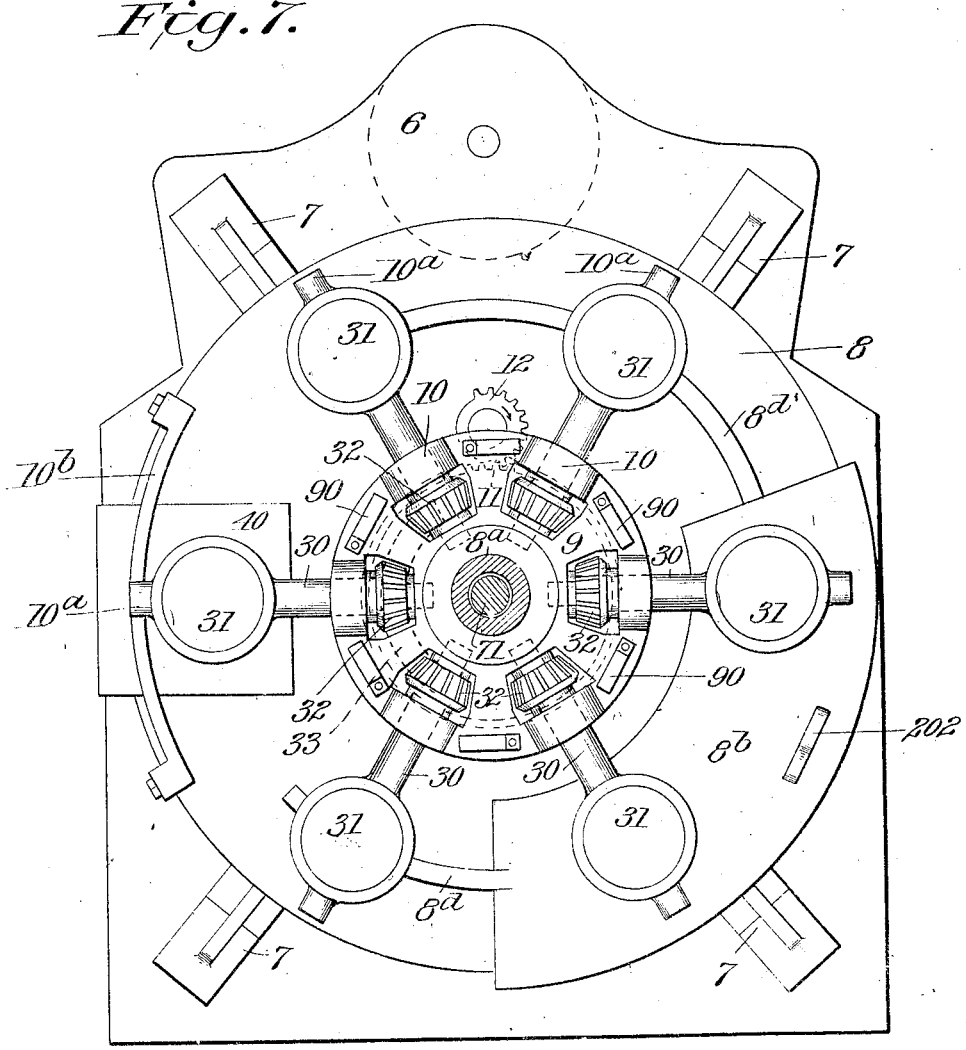

C. RANKIN.
GLASS MOLDING MACHINE.
APPLICATION FILED FEB. 11, 1916.

1,217,635.

Patented Feb. 27, 1917.
12 SHEETS—SHEET 7.

Inventor
Case Rankin
By
Attorney

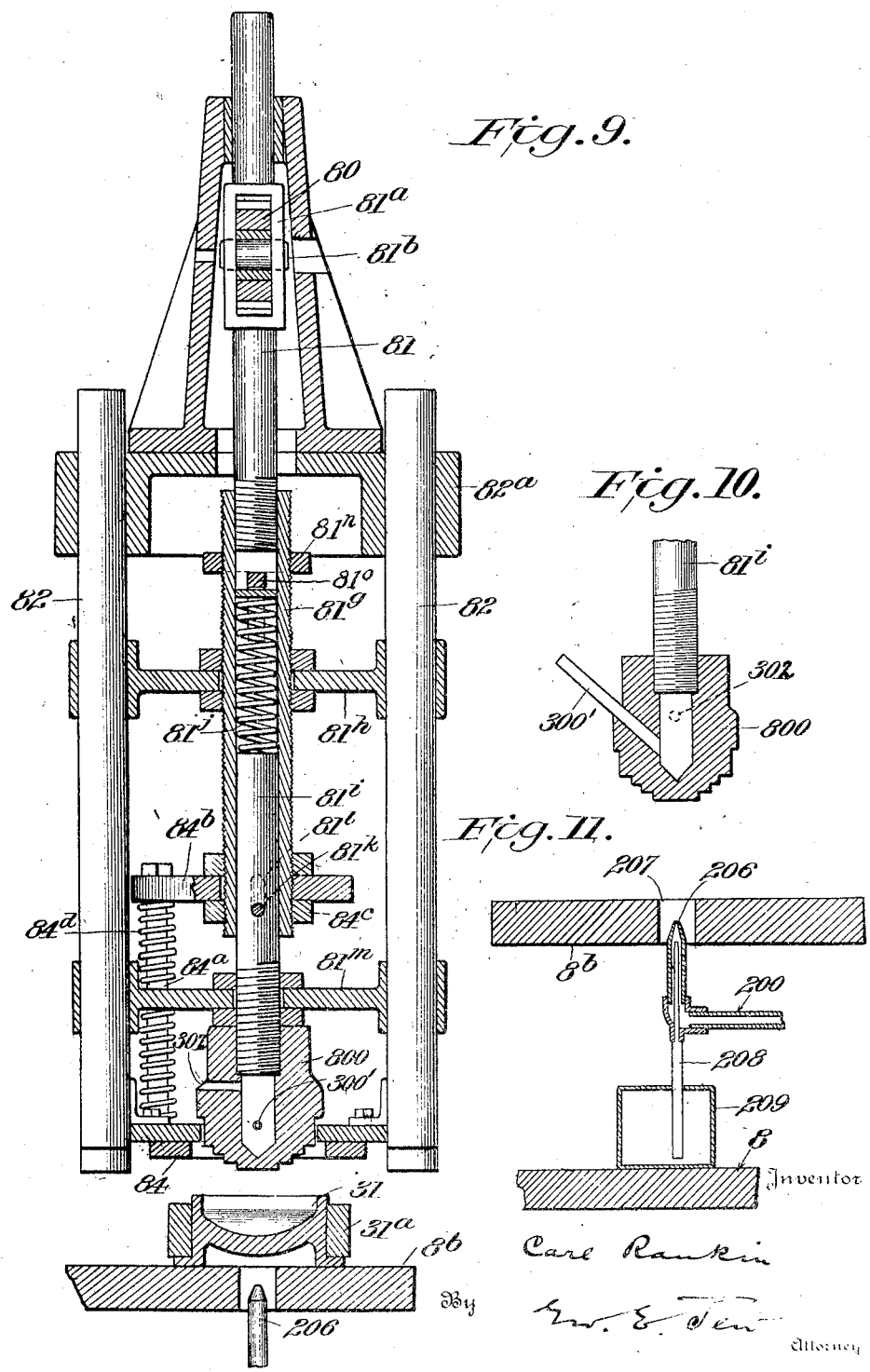

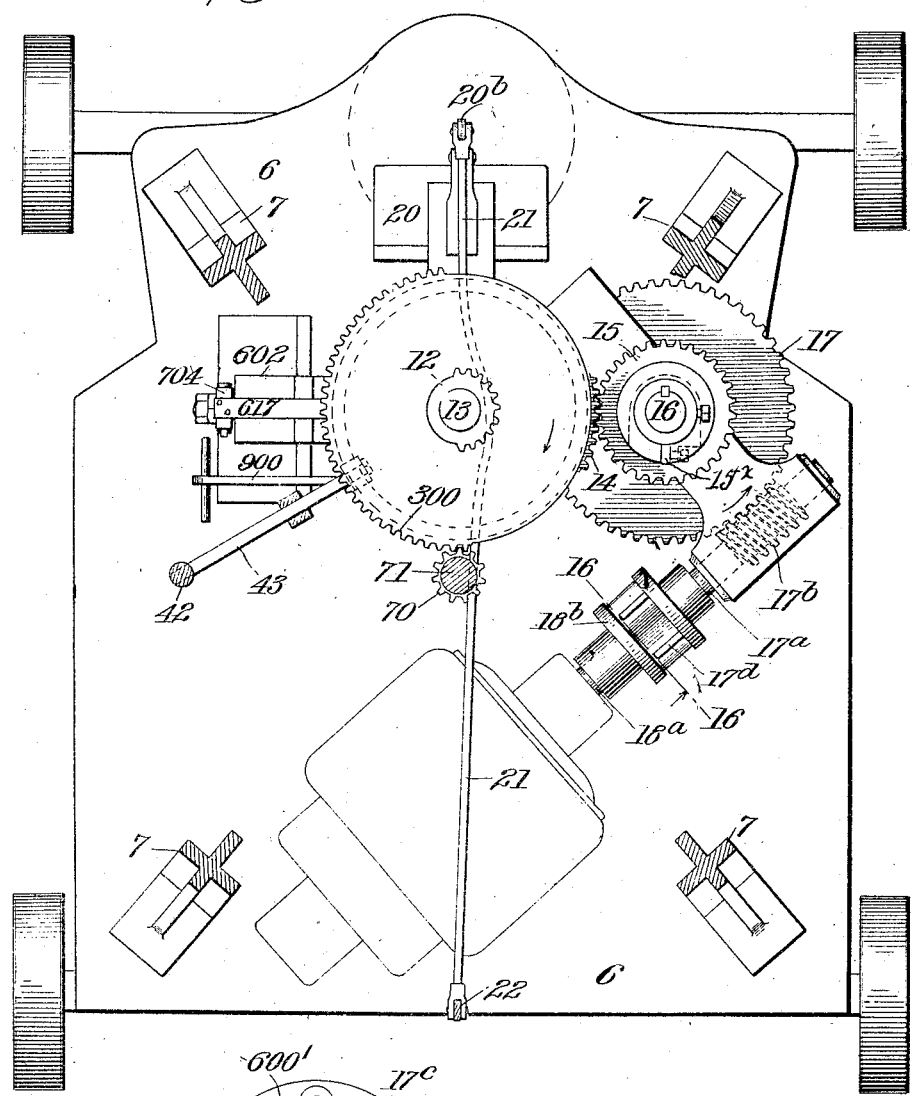

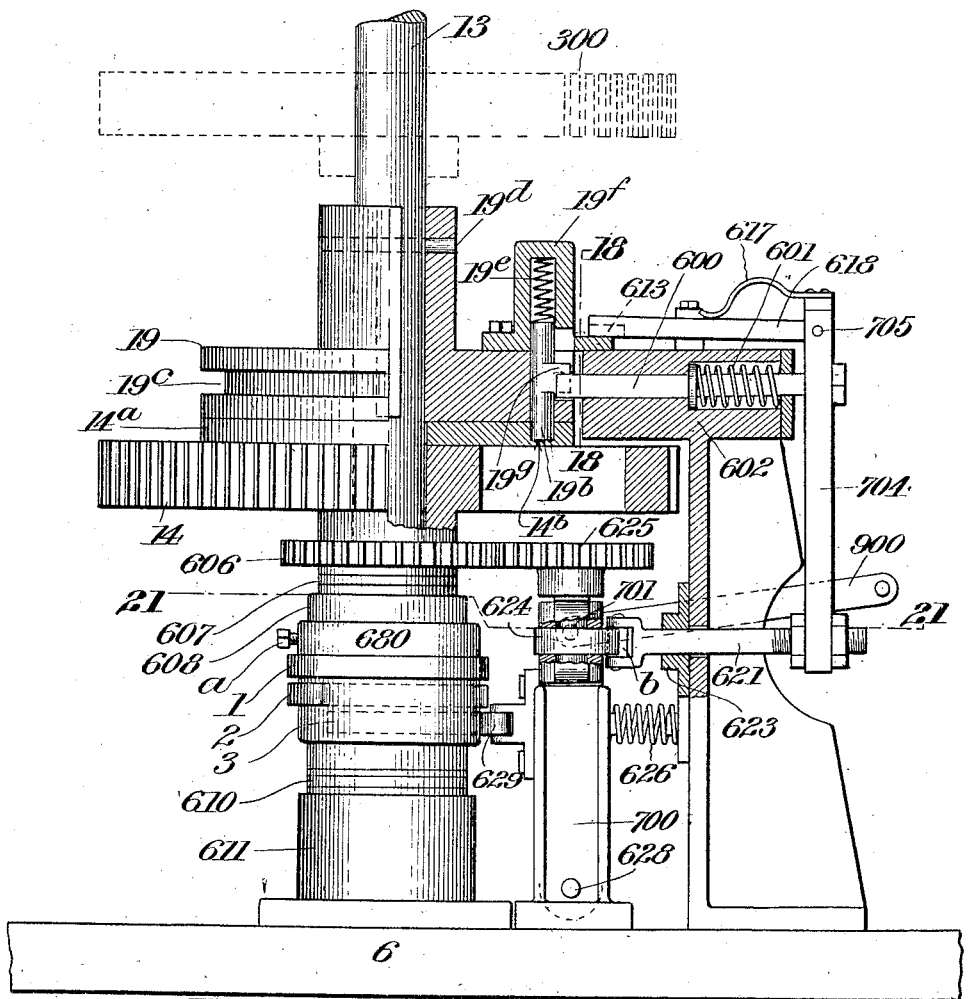

C. RANKIN.
GLASS MOLDING MACHINE.
APPLICATION FILED FEB. 11, 1916.

1,217,635.

Patented Feb. 27, 1917.
12 SHEETS—SHEET 12.

Inventor
Carl Rankin
By
Geo. E. Few
Attorneys

UNITED STATES PATENT OFFICE.

CARL RANKIN, OF WELLSBURG, WEST VIRGINIA, ASSIGNOR TO JEFFERSON GLASS COMPANY, OF FOLLANSBEE, WEST VIRGINIA, A CORPORATION.

GLASS-MOLDING MACHINE.

1,217,635.  Specification of Letters Patent.  Patented Feb. 27, 1917.

Application filed February 11, 1916. Serial No. 77,566.

*To all whom it may concern:*

Be it known that I, CARL RANKIN, a citizen of the United States, residing at Wellsburg, in the county of Brooke and State of West Virginia, have invented certain new and useful Improvements in Glass-Molding Machines, of which the following is a specification.

This invention relates to or comprises a machine for molding or pressing glass articles, and is particularly adapted for use in pressing what is known as flat-ware, such as lenses, mirrors, dishes and the like, but in its use it is not limited to the production of any special kind of ware. It is however particularly useful in producing articles by a pressing operation, without blowing.

Various machines are known, in which molds are carried in a rotary carrier, to several positions in succession, such as charging, pressing, blowing and discharging, the operations being more or less automatic. In its general features, the present machine has some resemblance to that type of machines.

The machine is of semi-automatic type, in which the charge of glass is or may be deposited by hand from a punty or gathering iron into one of a series of revolving molds, in what may be called the first or charging position, the particular mold at this time being face upward under a pair of shears which are automatically actuated to cut off the charge and drop the same into the mold. By the action of a trigger against which the punty is dropped, the machine is started, and the mold is carried to a second or pressing position where it is stopped in registry with a plunger to press the glass in the mold. The plunger is timed and operates automatically to descend for the pressing operation. The plunger dwells in the mold for a certain time. By a timing mechanism, the period of its dwell is controlled and regulated to suit the ware, since it must remain until the glass has taken its set, the time of which varies according to certain conditions, particularly the thickness of the article. After the pressing operation, and the lift of the plunger, the mold resumes its travel to a discharging position where it is inverted to drop the article therefrom. This action is assisted by a tapping device which is also automatically operated. Other molds are meanwhile brought to the various positions, and after being discharged each mold is righted or turned back to original position, preliminary to being recharged. Therefore the cycle involves the charging, by a workman, who by means of a trigger sets the starting mechanism; the start and partial revolution to pressing position; a stop and dwell while the pressing is done and while the next mold is being charged; and then another start and stop, and so on in succession, the delivery at the discharging position occurring while charging and pressing are occurring in following molds. By this means, the capacity of the machine is substantially equivalent to the time required for pressing and for movement from one position to the next, since charging may be done as rapidly as pressing. But, since the machine must be started, or at least set for starting, at each charging operation, the periodicity of the machine may be as slow as the charging intervals require.

A machine embodying the invention is shown in the accompanying drawings, in which:

Fig. 3 is a rear elevation.

Fig. 4 is a central vertical section of the upper part of the machine.

Fig. 5 is a detail of the gear for rotating or inverting each mold at discharging position.

Fig. 6 is a plan of the machine.

Fig. 7 is a horizontal section on the line 7—7 of Fig. 1.

Fig. 9 is a vertical section of the press plunger and associated parts.

Fig. 10 is a detail in section of the plunger head.

Fig. 11 is a detail in section, on the same plane as Fig. 10, of the oiling mechanism for the plunger head.

Fig. 15 is a horizontal section on the line

Figure 1:
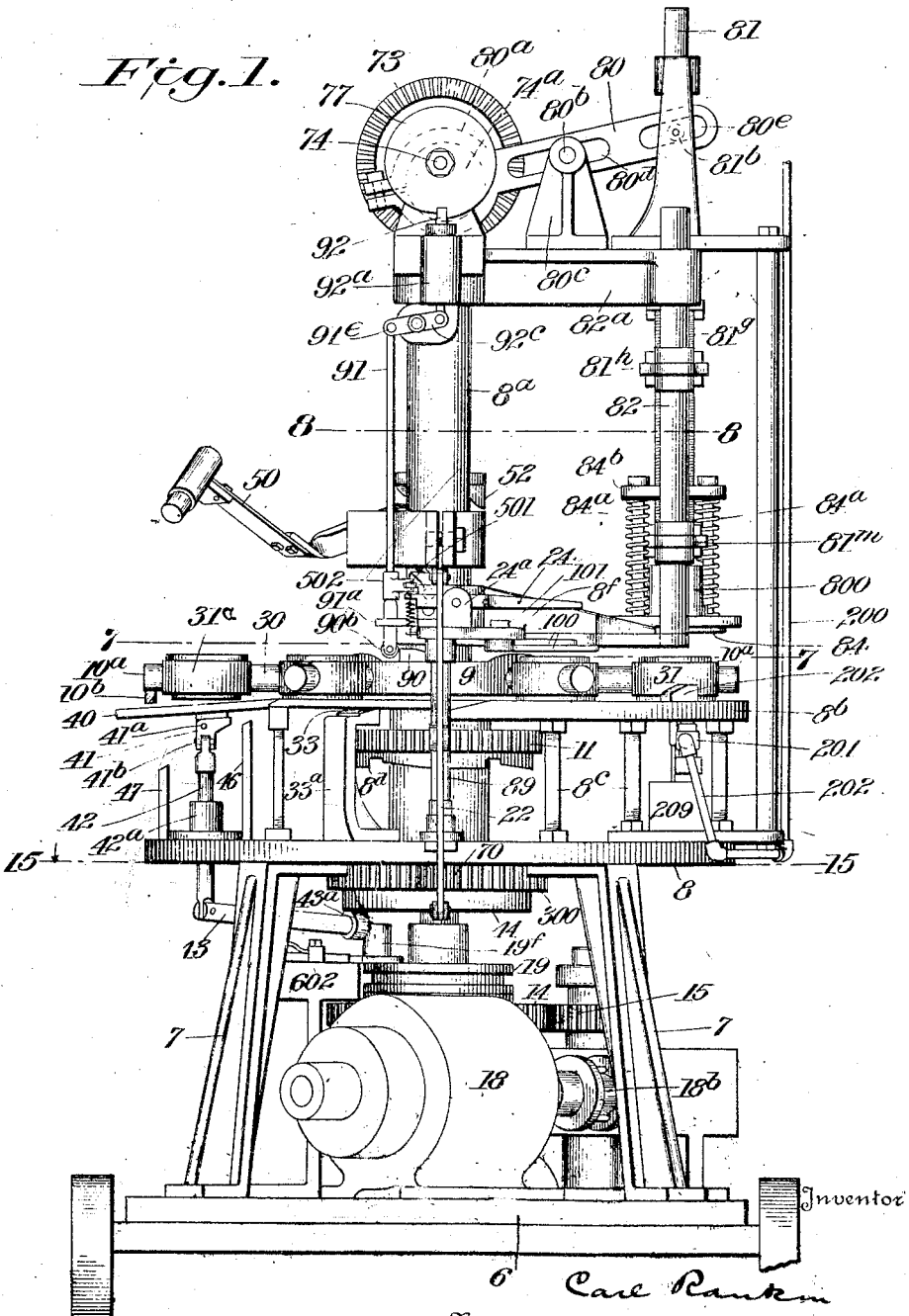
Figure 1 is a front elevation of the machine.

15—15 of Fig. 1. showing the driving mechanism below the table.

Fig. 16 is a detail in section on the line 16—16 of Fig. 15. showing a "break" coupling to the motor.

Fig. 17 is a detail in sectional elevation of the timing devices for controlling the dwell of the pressing plunger.

Fig. 18 is a detail in elevation taken on the line 18—18 of Fig. 17, showing part of the clutch.

Fig. 19 is a detail in elevation of part of the timing mechanism.

Figure 20:
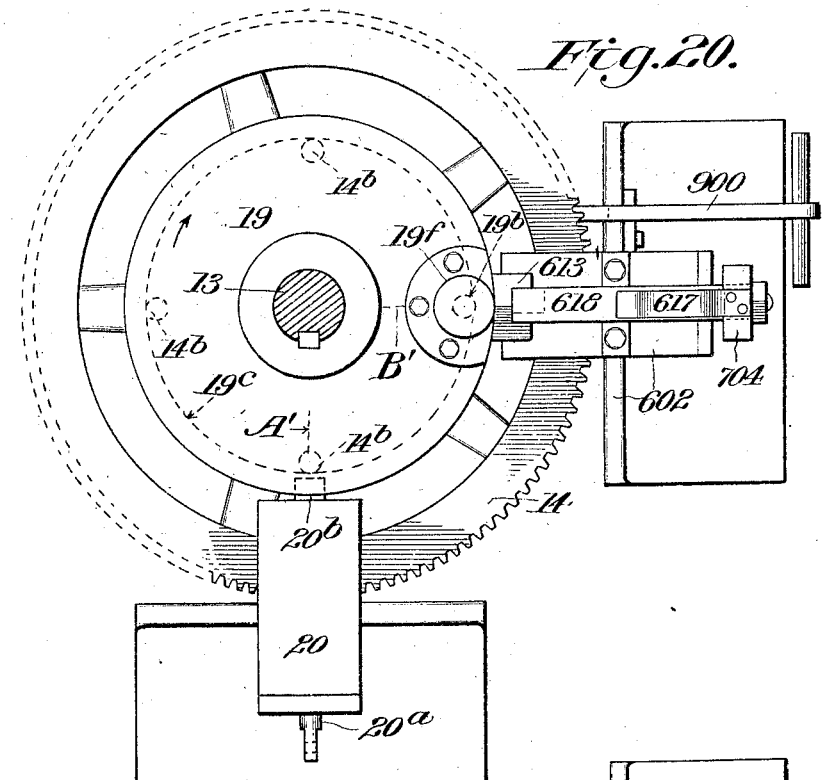

Fig. 20 is a plan of the parts shown in Fig. 17.

Figure 21:
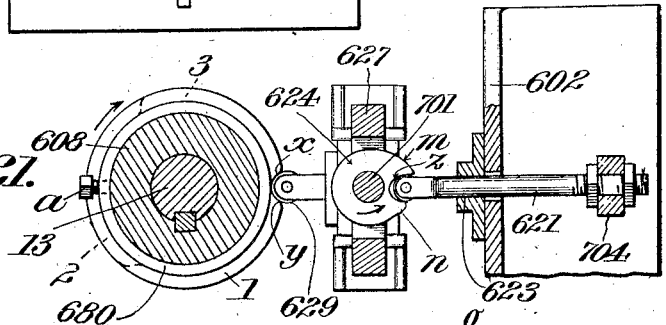

Fig. 21 is a section on the line 21—21 of Fig. 17.

Figures 22, 23:
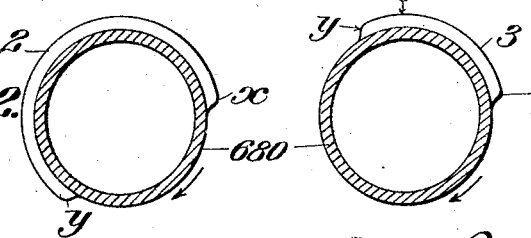

Figs. 22 and 23 are plans of two of the timer cams.

The machine embodies a wheeled base 6 on which the mechanism including the motor is mounted. Legs 7 on the base support a circular table 8 upon which stands a hollow standard 8$^a$ which supports the plunger mechanism as well as forming an axis for the rotary mold carrier. This table supports, by standards 8$^c$, a segmental shelf or plate 8$^b$, which extends across the charging and pressing positions. The rotary mold carrier consists of a spider 9 which has, in the present machine, six radial bearings 10 for the mold holders. It is within the invention to vary the number of mold holders as desired, or to use less than the number provided. The spider is free to revolve on the standard 8$^a$, and it has a hub 9$^a$ fixed to the hub 11$^a$ of a spur gear 11, these parts resting on a brass collar 11$^b$ supported by a sleeve 8$^d$ at the center of the table 8, the standard 8$^a$ being stepped and fixed in the sleeve. When, as shown, six mold holders are provided, the operation is such that the spider revolves one-sixth of a revolution at each step, to successively register a mold with the corresponding charging and pressing positions. The spider is driven intermittently by a mutilated gear 12 (Figs. 4, 7, and 15) carried at the top of a master or clutch shaft 13 which extends through the table 8. (This table is omitted in Fig. 15 for the sake of clearness). The shaft 13 carries a loose spur gear 14 near its lower end, meshing with a pinion 15 on a worm shaft 16 having a worm gear 17 which is driven by a worm 17$^b$ on the shaft 17$^a$ which is coupled to the shaft 18$^a$ of the motor 18 which stands on the base of the machine. The coupling is a flexible or yielding coupling illustrated in Figs. 15 and 16, to prevent shock, comprising disks 17$^c$ and 18$^b$ on the shafts, having respectively eccentric projecting pins 17$^d$ and 18$^d$ with a belt 600′ bent around the pins. A "break" pin 15$^x$ is provided between the shaft 16 and pinion 15, which will break if the machine should become clogged, to avoid wrecking the machinery.

The worm shaft 16 rotates continuously and the gear 14 revolves continuously, being as stated, loose on the shaft 13. This gear 14 is fixed to or carries a disk 14$^a$, which forms one member of a clutch for driving the shaft 13, the other member of the clutch comprising a wheel 19 having a peripheral groove 19$^c$, and the hub of this wheel is fixed to the shaft 13 as by a pin 19$^d$. The wheel 19 carries a vertical drop or clutch pin 19$^b$ adapted to engage in any one of the series of holes 14$^b$ in the upper face of the disk 14$^a$. When the pin is so engaged the shaft 13 is rotated and when the pin is disengaged the shaft 13 stops and so does the carrier and the plunger. The pin is pressed down to engage the disk by a spring 19$^c$ in a housing 19$^f$ on the clutch member 19. The pin is controlled both by a starting or tripping mechanism operated by the workman, and by a timing mechanism for the dwell of the plunger, to be described hereinafter. The pin has an inclined lug 19$^g$ which projects into the groove 19$^c$ when the pin is engaged in a hole 14$^b$.

Figure 2:
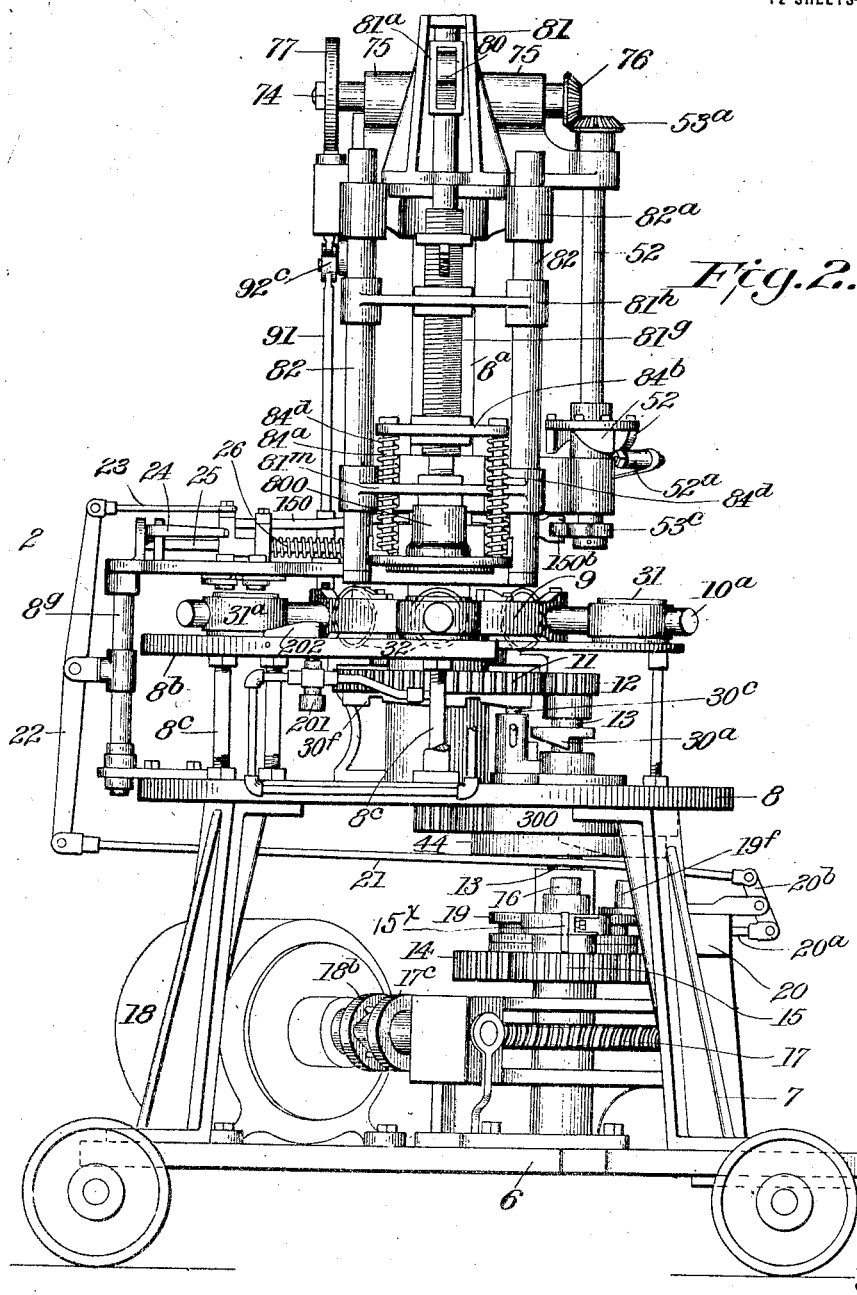
Fig. 2 is a side elevation.
Figure 8:
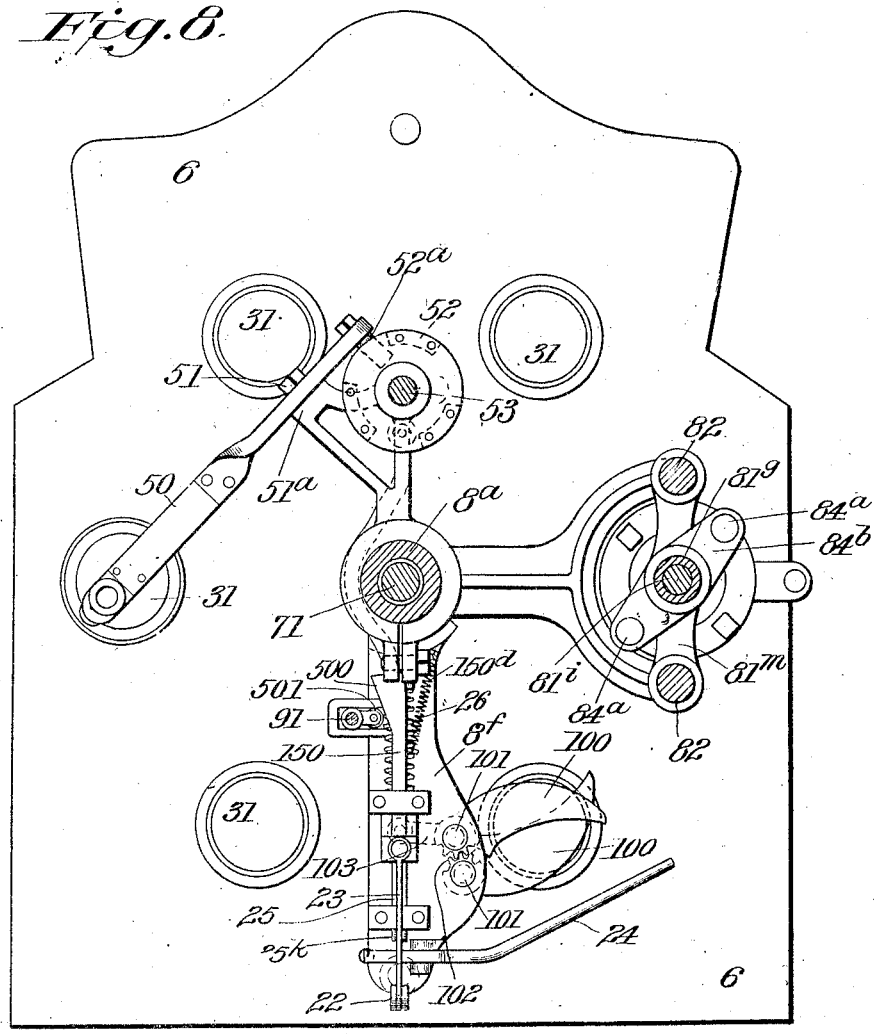
Fig. 8 is a horizontal section on the line 8—8 of Fig. 1.

For the starting operation, the pin and consequently the clutch is controlled by a knock-out or pin-lifting device which comprises a sliding rod 20$^a$ which works in a guide casing 20, and the inner end 20$^b$ (Fig. 20) of this rod may be advanced into or retracted from the groove 19$^c$. When so advanced, it is struck by the lug 19$^g$, lifting the pin 19$^b$ and disengaging the clutch. The rod 20$^a$ is connected by lever 20$^b$, link 21, lever 22, and rod 23 to a block 25$^a$ (Fig. 12) mounted on or forming part of a spring bolt or rod 25 which slides in guides 25$^b$ on a plate or support 8$^f$ adjacent to the charging position of the machine. The rod 25 has a notch 25$^c$, and this rod is normally pressed inwardly by a coiled spring 26 in compression between a head 25$^d$ on the rod and the guide 25$^b$. When so pressed inwardly the action is to retract the rod 20$^a$ and withdraw its end 20$^b$ from the groove 19$^c$, and permit the clutch pin 19$^b$ to drop and engage in one of the holes 14$^b$ and start the shaft 13. When the rod 25 is pushed out (by means to be hereinafter described) the end 20$^b$ will project into the groove to engage the pin 19$^b$ and disengage the clutch, and, also, the notch 25$^c$ in said rod 25 is then engaged by the inner end of a trip lever 24 which is pivoted to a bracket 24$^a$ on the support. As will be observed particularly in Figs. 6 and 8 the trip lever occupies a position directly beside, and slightly above (see Fig. 2) the charging position of the mold, and it may now be remarked that when the workman with his punty and charge of glass thereon deposits the latter in the mold in position indicated at A, Fig. 6, he then drops the punty onto the trip lever 24 lifting the inner end of the same from the notch 25, and the spring 26 snaps the rod 25 inwardly, and, by the lever and link connections described, the knockout rod 20ᵃ is pulled out so that the pin 19ᵇ will drop into one of the holes 14ʰ and the clutch and the shaft 13 will thus be picked up and turned, at which instant its gear 12 will pick up the gear 11 and turn the spider to carry the mold just filled to the pressing position. The number of teeth on the gear 12 is such that, in the machine shown, the mold carrier will revolve one-sixth of a revolution, at which time the gear 12 will become disengaged at its blank part, and the revolution of the carrier will stop.

But it is necessary, in order to prevent "spin" of the mold carrier, and to position the charged mold in exact position for pressing, that the mold carrier be positively stopped, and this is done by the following device: 30ᵃ is a cam carried by the shaft 13, and adapted to act on a lug 30ᵇ projecting from a stop pin 30ᶜ (Fig. 4) which works up and down in a guide 30ᵈ on the table, this pin being pressed from below by a spring 30ᵉ. This stop pin, except when depressed by the cam, engages at its upper end any one of a series of notches 30ᶠ in a plate 30ᵍ on the under side of the gear 11, these notches being located in exact alinement with the respective positions of the mold carrier. When the gear 12 drops the gear 11 the cam 30ᵃ runs off the lug 30ᵇ, and the stop pin lifts into a notch, thereby positioning the mold exactly, and the stop pin remains engaged until it is again depressed by the cam 30ᵃ when the gear 12 next picks up the gear 11.

Each mold holder consists of a radial shaft 30, which extends through one of the bearings 10 in the spider 9, and has an annular holder 31ᵃ for the mold section 31 fitted therein. At its inner end each shaft 30 has a pinion 32 adapted to mesh with a fixed segmental rack 33 supported by a standard 33ᵃ on the table 8, at the discharging or mold inverting position indicated at C, Fig. 6. When, in the revolution of the carrier, the pinion engages this rack, the mold is turned up-side-down to discharge the article onto a tilting pan or plate 40. This plate is supported by a universal joint 41, the two pivots of which are indicated at 41ᵃ and 41ᵇ, at the upper end of a rod 42 which works up and down through a guide 42ᵃ on the table, and is operated by a lever 43 and a cam 44 on the under side of a gear 300 on the shaft 13 (see Fig. 4). The lever 43 has a roller 43ᵃ which follows the cam. The shape of the cam is such that when the mold is inverted over the plate the latter drops, and at other times the plate is raised, as shown in Figs. 1 and 3, to position directly or close up under the mold. As stated, the plate is supported by a universal joint, and the arrangement of the gear 33 is such that the mold begins to turn over just before it reaches the plate. After the mold begins to turn it strikes the edge of the plate or pan 40 and thereby tilts the plate on the pivot 41ᵇ so that the plate tilts up or toward the face of the mold, the purpose being to avoid any shock in dropping the lens or other article. As the mold continues to revolve, and also to turn over, the pan, by reason of the universal joint, follows the movement of the mold and is finally dropped by the action of the cam 44, and when so dropped, it tilts outwardly, or its outer edge descends, the pan turning on the pivot 41ᵃ to an outwardly inclined position, this action being produced by the inner end of the pan coming in contact with an upright finger 46 standing on the table. The tilt is stopped by the outer part of the pan striking a shorter finger 47 near the outer edge, and the lens or other article which has been deposited on the pan by the inversion of the mold, slides off the pan into any suitable receiver placed to receive it, being by that time sufficiently cool to retain its shape. It will be understood that the mold carrier is stopped while the discharging mold is inverted over the pan, and pressing and charging are being performed in following molds. The rotation being picked up, the pan is then lifted by the cam 44 to original position, and the mold continuing to rotate by reason of the pinion 32 and the rack 33 is righted or turned face-up for the next charge, passing above an arm 8ᵈ' projecting from the shelf 8ᵇ.

To dislodge the article from the mold while the latter is inverted over the pan 40, it is desirable or necessary to tap the mold. This is done automatically by a hammer 50 pivoted at 51 on a suitable bracket 51ᵃ projecting from the standard 8ᵃ and operated by cams 52 on a cam or way-shaft 53 driven by suitable means to be described. The cams 52 work against a roller 52ᵃ on the hammer lever, and act to lift the hammer which drops by its own weight against the back of the mold, the arrangement being such that the hammer will preferably deliver two or three taps while the mold dwells thereunder. To prevent fracture of the shafts 10 by the tapping, each shaft has at its outer end an extension 10ᵃ beyond the mold which rolls over or along the supporting track 10ᵇ mounted on the table 8, the shaft being thus supported at both its inner and outer ends while the mold is being tapped.

This delivery operation is synchronous with the pressing operation, the mechanism for producing which is now to be described: The mutilated gear 300 is carried on the shaft 13 directly under the table 8, and it will be noticed (Figs. 4 and 15) that the blank part of this gear corresponds with the toothed part of the gear 12 which operates the carrier, so that while one is engaged the other is idle, the gear 300 being a master gear for the pressing mechanism, and the gear 12 for the carrier, whereby said mechanism is operated only when the carrier is stopped. The gear 300 meshes intermittently with a pinion 70 on the lower end of a shaft 71 which extends vertically through the hollow standard 8$^a$, and has a pinion 72 at its upper end which drives a gear 73 on a cross shaft 74 carried in brackets 75 mounted on top of the standard. The shaft 74 has a bevel pinion 76 driving a pinion 53$^a$ on the way-shaft 53, and thereby rotating said shaft to operate the hammer, and for other purposes, while the presser is operating. Said shaft 74 also carries a notched stop disk 77 which is engaged to prevent overthrow of the pressing mechanism. The shaft 74 also carries an eccentric 74$^a$ which works in an eccentric strap 80$^a$ on a lever 80 connected by a yoke 81$^a$ and pin 81$^b$ to the plunger rod 81. (Figs. 1 and 9). The lever 80 has a shifting fulcrum to accommodate the movement, the fulcrum pin 80$^b$ being mounted on a bracket 80$^c$ supported at the top of the standard, said pin extending through a slot 80$^d$ in the lever, and the roller pin 81$^b$ extends through a slot 80$^e$ in the end of the lever. As the eccentric operates the lever, the latter has a compound movement, the slot permitting the longitudinal traverse, and the vertical movement acting to reciprocate the plunger rod.

The plunger structure is as follows, see Fig. 9: The rod 81 is threaded into a threaded sleeve 81$^g$ which carries a cross head 81$^h$ sliding on guide rods 82 supported by a frame 82$^n$. In the lower end of the sleeve is a rod 81$^i$ pressed above by a spring 81$^j$ and having motion limited by a pin 81$^k$ in a slot 81$^l$ in the sleeve. The rod 81$^i$ is guided by a cross head 81$^m$ sliding on the guides 82, and carries a plunger head 800 which is shaped according to the article desired and matches the lower mold section 31. The plunger also carries a spring plate 84 to hold the mold ring down during the pressing operation, this plate being supported by rods 84$^a$ from a cross piece 84$^b$ held by nuts 84$^c$ on the sleeve 81$^i$, and spring 84$^d$ to permit the plate to yield. The threaded connections permit adjustment for position and work, and the construction produces a telescopic plunger which performs several important functions within the pressing stroke. Upon the down stroke of the plunger 800 it enters the filled mold 31. If, by any chance, too much glass is in the mold, the excess is taken care of by the action of the rod 81$^i$ which is free to move in the sleeve 81$^g$ against the tension of the spring 81$^j$ which allows the plunger to yield, thereby not forcing the glass between the ring and the mold. The nut 81$^n$ and the key 81$^o$ are for the purpose of increasing the spring pressure when desired. In the position shown in Fig. 9 the spring is completely extended, and the pressure of the glass is governed by the amount required to compress the spring from its extended position, and by screwing the nut 81$^n$ down the spring is compressed and the amount of pressure is increased.

To prevent overthrow of the plunger operating devices, and to permit the stroke when the plunger is in exact position to register with the mold, the notched stop disk 77 is provided. The notch in this disk is engaged by a pin stop 92 when the gear 300 drops the pinion 70. This pin 92 works through a guide 92$^a$ on the top bracket, and is lifted by a spring 92$^b$ to engage in the notch at the proper time. It is connected by a lever 92$^c$ to a rod 91. The lower end of this rod (see Fig. 13) is slidable laterally in a frame 91$^a$ and has at its lower end a roller 91$^b$ adapted to ride over a series of cams 90 on the upper face of the mold carrier. These cams act to lift the rod and withdraw pin 92 from the notch in the wheel 77 when the master gear 300 takes up the plunger operating devices, and the cams correspond in position to the respective pressing positions of each mold. When the stop pin is withdrawn the pressing action starts, and the pin 92 then follows the edge of the wheel 77, ready to snap into the notch when the stroke is completed, thereby preventing any overthrow of the pressing mechanism after the gear 300 drops the pinion 70. When the pin 92 is disengaged, as stated, the roller 91$^b$ is on the rise of a cam 90, and in order to permit the pin 92 to act or lift it is necessary that the roller be knocked off of the cam before the disk 77 makes a complete turn. This is done by means of a push rod 150 which works across the machine above the mold carrier, being guided at one end in the block 25$^b$ and at the other end in a bracket 150$^a$. This rod has a roller 150$^b$ bearing against a cam 53$^c$ on the lower end of the way-shaft 53, and the rod also has a cam 500 pressing against a roller 501 supported by a suitable bracket 502 on the rod 91. The cam 53$^c$ is timed so that after the pressing operation commences the rod will be advanced and the cam 500, bearing laterally against the rod 91 will swing said rod on its pivot 911 and drop it off of the cam 90, thereby setting the pin 92 free so that its spring 92$^b$ may lift it into the stop notch in the disk 77 when the stroke is completed.

Figure 12:
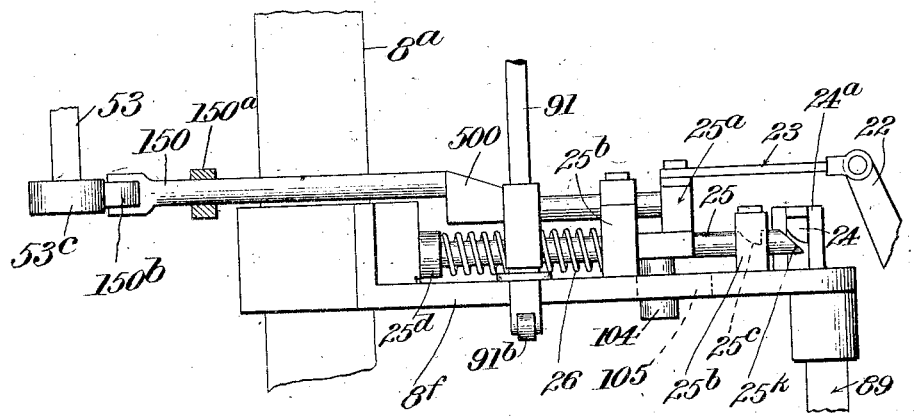
Fig. 12 is a side elevation.
Figure 13:
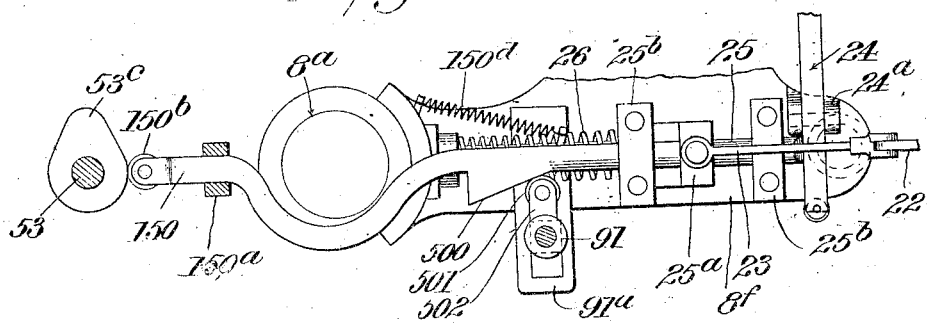
Fig. 13 is a plan, showing the starting and tripping mechanism.

The rod 150 also serves another function, that is, to set the trigger rod 25, as follows: The outer end of the rod 150 abuts against the block 25$^a$, as shown in Figs. 12 and 13, this block 25$^a$ being rigid with the rod 25, as heretofore explained. When the rod 150 is advanced by the cam 53ᶜ it carries with it the block 25ᵃ and rod 25, and the beveled end 25ᵏ of the latter picks up the trigger 24 and permits said trigger to drop into the notch 25ᶜ, the spring 26 being compressed. This sets the trigger for the next operation by the workman. By the same movement, the lever 22, rod 21 and lever 20ᵇ act to shift the pin 20ᵃ and advance its end 20ᵇ into position to lift the clutch pin 19ᵇ of the main clutch and thereby stop the rotation of the controlling shaft 13 and the parts driven thereby until the machine is again started by the workman releasing the trigger 24. In short, the advance of the rod 150 serves to reset the machine, as well as permitting a positive stop to the plunger operating device. After passing the cam 53ᶜ the rod 150 is retracted by the spring 150ᵈ without, however, releasing the rod 25 which is left in set position until the next operation when it snaps back with its block 25ᵃ toward or in close position against the end of said rod 150, as in Figs. 12 and 13.

It may be mentioned here that while in the charging and pressing positions the molds are held in face-up position by sliding over the plate or shelf 8ᵇ, the supports 8ᶜ of which are adjustable to accommodate molds of different sizes. This sliding contact holds the molds face upright and prevents any turn thereof, or of the shafts 10.

For cutting off the charge from the punty at the charging position a pair of shears 100 are provided. See Figs. 6 and 8. These shears are pivoted at 101 to the plate 8ᶠ which is fastened at one end to the standard 8ᵃ and supported at the other end by a post 8ᵍ. These shears have meshing gear segments 102 about their pivots, and one of them has an arm 103 pivotally connected to a pin 104 (Fig. 12) depending from the rod 25 through a slot 105 in the plate 8ᶠ. The cutting edges of the shears are curved on such an arc that said edges are concentric at the cutting point with the mold, whereby the charge is dropped at substantially the exact center of the mold. It will be understood that in the charging operation the punty is held with its end above the mold, and when it is dropped slightly to release the trigger 24 and the rod 25, the latter springs inwardly, thereby closing the shears and cutting off the charge which falls into the mold at position A in Fig. 6, the action being automatic with the release of the trigger.

Figure 14:
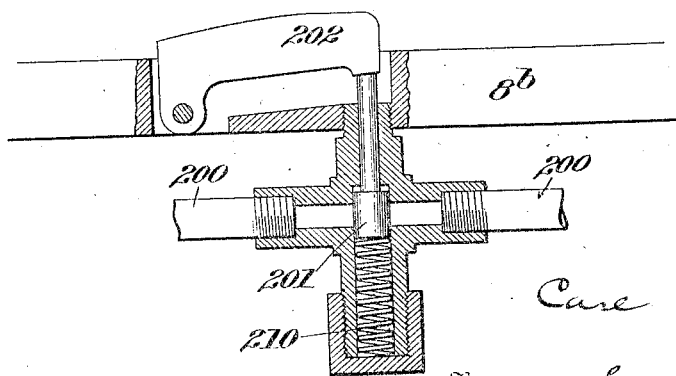
Fig. 14 is a detail in section of the air feeding valve for the oiling device.

It is desirable or necessary to oil the plunger head 800 before each pressing operation. This is done by means of an atomizer device shown especially in Figs. 1, 10, 11 and 14. A pipe line 200 leads from a suitable source of air pressure to a nozzle 206 which is located in a hole 207 in the shelf 8ᵇ directly under the plunger. The nozzle receives an ejector pipe 208 which dips into an oil tank 209 on the table 8. In the air line 200 is a valve 201 (Fig. 14) normally held closed by a spring 210. The valve stem is located under a pivoted presser 202 in a recess in the shelf 8ᵇ, and in the line of movement of the stud or extension 10ᵃ on each shaft 10. As the carrier revolves the stud depresses the presser and opens the valve 201, and the blast of air flowing through the nozzle aspirates a quantity of oil from the oil tank and sprays the same onto the face of the plunger head just before the mold reaches the pressing position. After the presser 202 is released the valve is closed by the spring 210.

The plunger head is made hollow and is cooled by an air line 300′ opening into the plunger head, the air escaping through vents 302 therein.

After the machine is started by the charging action as above described, it is necessary to stop the mold carrier when it reaches the pressing position, and to hold it stopped during the pressing operation. It is also desirable or necessary to vary the time of dwell of the pressing plunger in the mold, to allow time for the article to set or cool sufficiently to retain its form. This time varies according to the thickness of the article, or other conditions, and therefore I provide a selective timing mechanism which, after the mold carrier is stopped, causes it to dwell for a selected period, and then to release the same for a new start. This mechanism is illustrated particularly in Figs. 17 to 23.

As heretofore stated the gear 14 rotates constantly, and when the pin 19ᵇ carried by the clutch wheel 19 drops into one of the holes 14ᵇ at the charging position, the machine starts, that is, the shaft 13 turns with the gear 14. The clutch is disengaged by lifting the pin 19ᵇ at the pressing position. This is done by means of a pin 600 pressed inwardly by a spring 601, and working in a casing 602 mounted on the base of the machine. The end of this pin normally projects into the groove 19ᶜ in position to engage the cam lug 19ᵍ and lift the pin, and the machine remains stopped until the pin 600 is retracted, permitting the pin 19ᵇ to drop and engage in one of the holes 14ᵇ, to again pick up the shaft 13. The plunger therefore remains in the mold, (being at this time at the limit of its down stroke) while the pin 600 holds the clutch pin in raised position, and the dwell is varied or controlled by governing the said period.

The gear 14 has secured thereto a small timing gear 606, said gears 14 and 606 being supported by a thrust bearing 607 resting on a supporting sleeve 608 keyed to the shaft 13, with a bottom thrust bearing 610 set on a block 611 on the bed plate 6, which supports the entire mechanism. A series of timing cams 1, 2, and 3 are secured in adjustable position to the supporting sleeve 608, as by a set screw *a* in a sleeve 680 on which the cams are mounted. Pivoted between brackets 700 on the bed plate of the machine, by a pin 628, is a rocker box 627 the upper end of which carries an upright stub shaft 701 on which is mounted a gear 625 which meshes with the gear 606, at times. A spring 626 tends to swing the rocker to engage said gears, and said rocker also carries a contact roller 629 which bears against one of the cams 1, 2 or 3. These cams may be shifted up or down on the sleeve 608 to locate the desired cam opposite said roller. The shaft 701 also carries a cam 624 which bears against a roller *b*, on a rod 621 which works through a bearing 623 in the supporting bracket 602. The rocker is "yoked" around the cam as shown at 681. The rod 621 carries a rigid arm 704 which is connected to the rod 600 and also is pivotally connected by a pin 705 to a latch or arm 618 which is pressed by a spring 617 and is adapted to be lifted by a cam projection 613 on the housing 19$^f$ of the drop pin 19$^b$.

The cam surfaces of the cams 1, 2 and 3 vary according to the dwell desired. In this particular machine cam 1 will cause a dwell of about two and one-half seconds, cam 2 about two-thirds of that time, and cam 3 about one-third of that time, and it may be stated that by pulling the rod 900 the rocker may be swung out and the entire timing mechanism disengaged, and the machine will not rest until it has made a complete cycle, from one starting position to the next, being then controlled only by the rod 20$^a$.

The dwell or timing is governed by the time it requires for cam 624 to make a revolution and operate the clutch, and the operation of the timing mechanism will now be described.

The position A', Fig. 20, will be referred to as the starting position, corresponding to the charging position A, Fig. 6, and the position B', Fig. 20, will be referred to as the dwelling or pressing position, corresponding to the position B, Fig. 6. The description will first assume that the cam 1 is being used, as that is the simplest, although the drawings show cam 3 in operative position. The part 19 and its pin 19$^b$ will be referred to as the "clutch".

After the machine is started, by tripping the lever 24 and retracting pin 20$^a$, the clutch turns until it reaches the position B' as shown in Fig. 20. Fig. 17 shows the clutch pin about to be lifted by the pin 600. When the clutch pin is lifted the clutch stops, the shaft 13 stops, and the plunger mechanism stops, the gear 300 being at this time in engagement with the pinion 71, and the plunger being at the limit of its down stroke. The dwell of the plunger continues until the pin 600 is withdrawn to allow the clutch pin 19$^b$ to reëngage. The pin 600 is withdrawn by the rise *m* on the cam 624.

At the time the clutch is stopped the parts are in the position shown in Fig. 21, the roller 629 having dropped off of the rise of the cam 1 at the point *y*, and the roller *b* having dropped off the rise *m* of the cam 624. In this stopped position the shaft 13 has ceased to turn, and consequently the cam 1 has ceased to turn, (being carried by said shaft), but when the roller 629 runs off the point *y* the spring 626 swings the rocker and meshes the gear 625 with the constantly rotating gear 606 which is fixed to drive gear 14. This starts the rotation of the shaft 701, and the cam 624 begins to turn in the direction shown by the arrow thereon until it makes one revolution, at which time the rise *m* pushes out the pin 600 and permits the clutch pin 19$^b$ to drop and start the clutch, the shaft 13, the cam 1, the gear 300 and the plunger mechanism. This lifts the plunger and the machine then moves to starting position A' and the roller *b* runs off the rise *m* and drops into the notch *z* thereby letting the spring 601 advance the pin 600 into the groove 19$^c$ just behind the pin 19$^b$, which has just advanced beyond said pin, the inward movement of the pin 600 being slightly delayed by the latch 618 to allow the pin 19$^b$ to get clear, said latch dropping down against the outer edge of the cam 613 and holding the pin out until the cam travels beyond the end of the latch. Directly after the shaft 13 begins to turn, the roller 629 rides up the rise *x* of the cam 1 and disengages the gear 625 from the gear 606. This stops the turn of the cam 624, or rather prevents it from starting, until the cam 1 makes a complete revolution. When cam 1 completes its revolution the roller 629 drops in at point *y*, the shaft 13 stops, the cam 1 stops, the gears 625 and 606 engage, and the cam 624 begins to turn and the operation is repeated. The plunger therefore dwells while cam 624 makes a complete revolution.

It may be explained that the notch *z* in the cam 624 is deep enough to permit the outward swing of the rocker without withdrawing the pin 600, which is withdrawn only by the rise *m*, and this notch also serves the purpose of preventing "spin" of the gear 625 after it is disengaged from the gear 606, and holding said gear 625 in proper or "centered" position to mesh with the gear 606 when the rocker swings in again; otherwise the gears might strike the points of their teeth together. This action is assisted by the slight rise *n*, beside the notch *z*, which prevents spinning or fouling of the gears.

Fig. 17 shows the cam 3 set for action.

With this cam the dwell is only one-third of that produced by the cam 1, as its rise is only one-third as long, and consequently the gears 606 and 625 are disengaged for only one-third of the time. Assuming that cam 3 is used, the operation is this:

When the clutch has reached the point B' and its locking pin has become disengaged, stopping the rotation of said clutch and the shaft 13 and cam 3, the roller 629 is just in advance of the point $x$ of cam 3, but still allowing the gear 625 to mesh with the gear 606, and continued rotation of the gear 625 (from the gear 14) will cause the cam 624 to throw out the pin 600 as described for cam 1. As soon as pin 600 is thrown out the clutch begins to revolve, revolving shaft 13 and the cam 3, said operation causing the roller 629 to immediately ride up the rise $x$ of cam 3, which disengages the gear 625 from the constantly driven gear 606. The clutch will continue to revolve until it reaches its starting point A', and cam 3 will revolve therewith. When the clutch stops at starting point A' the roller 629 will be resting on the raised portion of the cam 3 at approximately the point $o$, it being understood that the gears 625 and 606 are out of engagement during the period of rotation of the clutch from its point B' to its starting point A'. When said clutch has reached its starting point A' it is automatically stopped by the pin 20ª and the roller 629 is still resting upon the cam 3 at the point $o$. When the machine is put in operation through withdrawal of the pin 20ª as heretofore described the cam will take up its rotation with the clutch and shaft 13 and the roller 629 will drop off the raised portion of cam 3 at the point $y$ and as soon as said roller drops off at the point $y$ the gear 625 is again engaged with the gear 606, (said gear 606 being constantly driven) and a rotation of the cam 624 is commenced. The cam 3 continues to revolve with shaft 13 and the clutch until the clutch reaches its resting point B' where the clutch is disengaged. At the same time the point $x$ on cam 3 has reached position adjacent the roller 629 and cam 3 stops rotating with the clutch. During the rotation of cam 3, while the low part of the cam from point $y$ to point $x$ is traveling against roller 629, the gears 606 and 625 are engaged, and the cam 624 has performed approximately two-thirds of its revolution. When cam 3 stops, point $x$ on said cam has as stated reached a position close to roller 629, but gears 606 and 625 remain in mesh and continue to rotate until cam 624 completes its revolution, or approximately one-third thereof, when the rise $m$ of the cam 624 will throw out the pin 600 and allow the clutch to again become engaged. This will start the clutch again in revolution, also the cam 3, which immediately throws out roller 629 by reason of the fact that it rides up the point $x$, disengages gears 606 and 625, which stops the rotation of the cam 624 in the position shown in Fig. 21 and it remains stopped until in the subsequent operation the roller 629 runs off the drop $y$, when the cam will repeat the operation described.

The plunger is caused to dwell only one-third of the time with cam 3, as compared to cam 1, by reason of the fact that with cam 3 the cam 624 is turned two-thirds of its revolution while the shaft 13 is rotating, that is, before the clutch reaches the position B', and after it reaches that position it has only one-third of its revolution to turn before the pin 600 is pulled out and the clutch reëngaged to lift the plunger, while in case of cam 1 the cam 624 does not start its revolution until the clutch is disengaged at position B'.

Cam 2 operates the same way as cam 3, but with a longer dwell according to the difference of the cam.

The operation of the machine may be summarized as follows: The master shaft 13 is normally stopped by the end 20ᵇ of the pin 20ª lifting the clutch pin 19⁶, the clutch member 14ª and its gear 14 being constantly rotated. When the workman charges the mold at A he trips the trigger 24 and the rod 25 snaps in and retracts the pin 20ª permitting the clutch to engage and start the shaft 13, the charge being cut off meanwhile by the shears. The shaft 13 and the mutilated gear 12 turn the mold carrier, advancing the mold just charged from position A to the pressing position B. The gear 300 then picks up the shaft 71 which operates the lever 80 and the pressing plunger descends, the carrier being meanwhile stopped by the pin 30ᶜ, and the next mold being at the same time brought to charging position. The plunger is then stopped by the pin 600 lifting the clutch pin 19ᵇ, and by means of the timing mechanism described the pin 600 holds the clutch pin 19ᵇ disengaged for a selected time, the plunger remaining in its down position. When the pin 600 is pushed out by the rise $m$ of the time controlled cam 624 the pin 19ᵇ drops and engages again, the gear 300 being, during this dwell, still in engagement with the pinion 70, and, the shaft 13 being thus started by reëngagement of the clutch, the plunger is lifted, said lift occurring during the movement of the clutch to original position, the rod 25 being meanwhile re-set by the cam 53ᶜ and the push rod 150, and the end 20ᵇ of the rod 20ª disengages the clutch and stops the machine, and it remains stopped until the workman again trips the release lever 24, when the gear 12 picks up the carrier and the operation is repeated. If, however, the workman shall have already tripped the lever and charged the next mold the rod 20ª will have already been retracted, and the clutch pin 19ᵇ will not be disengaged at the starting position, but the machine will immediately take up its cycle and advance the mold for the next pressing operation. Therefore the workman does not have to wait until the machine is stopped by the rod 20ª before charging the next mold, but can release the trip in advance. This saves a little time which would otherwise be required for the stop and start.

After the pressing operation, the mold is carried around step by step to the discharging position C, where it is inverted, tapped, and discharged, and then righted for the next charge.

The capacity of the machine is measured by the time required for each pressing operation and the movement from one position to the next, since charging and discharging may occur while the pressing is taking place. It may be noted that in case charging is delayed for any reason the machine will be stopped in charging position by the rod 20ª, and will not start again until said rod is retracted by the tripping device, but if the charging proceeds as fast as the pressing the operation will proceed without the machine being stopped by said rod 20ª.

The form and proportions of the gearing and the various cams will of course be suitable for the described operations, and various changes may be made with respect to the machine, within the scope of the invention. Especially, the number of molds may be varied, and the number of holes 14ᵇ in the clutch, and the number or proportions of the timing cams.

What I claim is:

1. In a molding machine, the combination of a revolving multiple mold carrier movable step by step to different positions, a pressing plunger coöperating with the molds successively in pressing position, means to operate the carrier and the plunger including a clutch, means to disengage the clutch with the plunger in pressing position, means to reëngage the clutch after such disengagement, means to disengage the clutch again before the carrier movement is started, and a manually operated device controlling the last mentioned means, said device being operable in advance of the disengagement of the clutch by the last mentioned means, whereby such disengagement is avoided.

2. In a molding machine of the type having a rotary mold carrier and a pressing plunger, the combination of a driving mechanism for the carrier and plunger including a clutch, means to intermittently stop the carrier with the molds in pressing position, a stop device coöperating with the clutch to disengage the same with the plunger in pressing position, timing mechanism operating on said stop device to reëngage the clutch, another stop device coöperating with the clutch to prevent starting of said carrier, and a manually operated trip connected to the last mentioned stop device and adapted to release the same and prevent the stopping action thereof, and means operated by said driving mechanism to reset the last mentioned stop device after its release.

3. In a starting mechanism for a molding machine of the type having a mold carrier movable step by step to charging and other positions, the combination of a clutch controlling said movement, a knock-out rod controlling said clutch, a spring-pressed trip rod connected to said rod and adapted when set to hold the same in position to disengage said clutch, and a trip lever engaging said trip rod and located in a position adjacent the mold being charged and adapted when released to permit the spring to operate said trip rod and allow the clutch to reëngage.

4. In a molding machine of the type having a multiple mold carrier movable step by step to charging and other positions, the combination of a clutch adapted to operate said carrier, a knock-out rod controlling the clutch, a trip rod connected to the knock-out rod, a spring engaging the trip rod and tending to shift the same and withdraw the knock-out rod to permit engagement of the clutch, means automatically actuated to shift the trip rod against the pressure of the spring and advance the knock-out rod into position to disengage the clutch, and a trip lever adapted to engage the trip rod when so shifted, the trip lever being positioned adjacent the mold in charging position and adapted for release by a charging tool.

5. In a molding machine of the type having a revolving multiple mold carrier movable step by step to register molds with pressing and discharging positions, the combination of means to invert a mold at discharging position, a reciprocating plunger, mechanism to operate said plunger on a mold in pressing position, and means operated by said mechanism to tap the inverted mold in discharging position.

6. In a machine of the type described, the combination of a revolving multiple mold carrier having a plurality of radial shafts provided with mold holders, means to rotate said shafts and invert each mold at discharging position, means to tap the mold so inverted, and a track on which the shaft of the mold being tapped is supported.

7. In a machine of the character described, the combination with a horizontal traveling carrier, a rotary mold holder carried thereby, and means to invert the holder at discharging position, of a tilting pan located under the mold holder so inverted and adapted to receive an article therefrom, and means to automatically raise and lower said tilting pan toward and from the mold holder, as the latter is operated.

8. In a machine of the character described, the combination with a traveling mold carrier, and means to invert the same in discharging position, of a pan at said position, below the mold, and adapted to contact therewith and follow the turn thereof, and a pivotal support for the pan, permitting said following action.

9. In a machine of the character described, the combination with a traveling mold carrier and means to rotate and invert the same at discharging position, of a tilting pan located at said position under the mold, a rod movable up and down, a universal joint between the rod and the pan, and means to move the rod up and down, said pan being located in position to be struck by the mold carrier as it turns over, and said universal joint permitting the pan to tilt one way to follow the inversion of the mold carrier and another way to permit the article to slide therefrom.

10. In a machine of the character described, the combination with a traveling mold carrier, and means to rotate and invert the same at discharging position, of a vertically movable rod located at said position, a pan supported by the rod, a universal joint between the pan and the rod, the pan being located in position to be struck by the carrier as it turns over, and means to lift the rod to normally hold the pan in such position and to lower the same after the mold carrier is inverted, said universal joint permitting the pan to tilt laterally to follow the mold carrier as it is turning over and to tilt outwardly when the rod is lowered.

11. In a machine of the character described, the combination with a traveling mold carrier, and means to rotate and invert the same at discharging position, of a vertically movable rod located at said position, a pan supported by the rod, a universal joint between the pan and the rod, the pan being located in position to be struck by the carrier as it turns over, and means to lift the rod to normally hold the pan in such position and to lower the same after the mold carrier is inverted, said universal joint permitting the pan to tilt laterally to follow the mold carrier as it is turning over and to tilt outwardly when the rod is lowered, and stops limiting the outward tilt of said pan.

12. In a machine of the type described, the combination of a revolving mold carrier, a pressing plunger coöperating with the molds in pressing position, a shaft operatively connected to said plunger, a stop device coöperating with said shaft to prevent overthrow, and means actuated by said carrier for controlling the operation of said stop device.

13. In a machine of the type described, the combination of a revolving mold carrier movable to successive positions, a plunger coöperating with a mold when in pressing position, a shaft operatively connected to said plunger, a notched stop disk on said shaft, a stop pin engageable in said notch to prevent overthrow of the shaft, and means carried by said carrier to release said pin before each operation of the plunger.

14. In a machine of the type described, the combination of a revolving mold carrier movable to successive positions, a plunger coöperating with a mold when in pressing position, a shaft operatively connected to said plunger, a notched stop disk on said shaft, a stop pin engageable in said notch to prevent overthrow of the shaft, and means carried by said carrier to release said pin before each operation of the plunger, said means comprising a series of cams mounted on the carrier, and a rod actuated by said cams and connected to the pin.

15. In a machine of the type described, the combination of a revolving mold carrier movable to successive positions, a plunger coöperating with a mold when in pressing position, a shaft operatively connected to said plunger, a notched stop disk on said shaft, a stop pin engageable in said notch to prevent overthrow of the shaft, and means carried by said carrier to release said pin before each operation of the plunger, said means comprising a series of cams mounted on the carrier, and a rod actuated by said cams and connected to the pin, and a device automatically actuated by the plunger operating means to dislodge said rod from the cam, during the stroke of the plunger.

16. In a machine of the type described, the combination of a revolving mold carrier movable to successive positions, a plunger coöperating with a mold when in pressing position, a shaft operatively connected to said plunger, a notched stop disk on said shaft, a stop pin engageable in said notch to prevent overthrow of the shaft, and means carried by said carrier to release said pin before each operation of the plunger, said means comprising a series of cams mounted on the carrier, and a rod actuated by said cams and connected to the pin, and a device automatically actuated by the plunger operating means to dislodge said rod from the cam, during the stroke of the plunger, said means including a cam shaft, and a cam rod operated by said shaft and working against said rod.

17. In a machine of the type described, the combination with a revolving mold carrier movable step by step to charging and other positions, of a cutting device comprising a pair of shears at the charging position, a trip rod operatively connected to said shears, a trip lever controlling said rod, a spring tending to shift the rod and close the shears when the lever is tripped, and means operating with the movement of the carrier to return and reset the rod and lever and open the shears.

In testimony whereof, I affix my signature in presence of two witnesses.

CARL RANKIN.

Witnesses:
F. S. TEW,
E. D. MOORE.